May 14, 1929.  G. W. HEBBELER  1,712,822
BATTERY
Filed Aug. 15, 1925  2 Sheets-Sheet 1
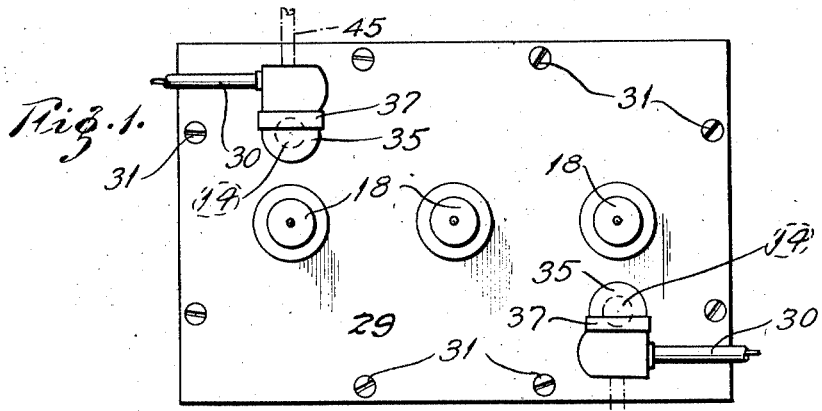
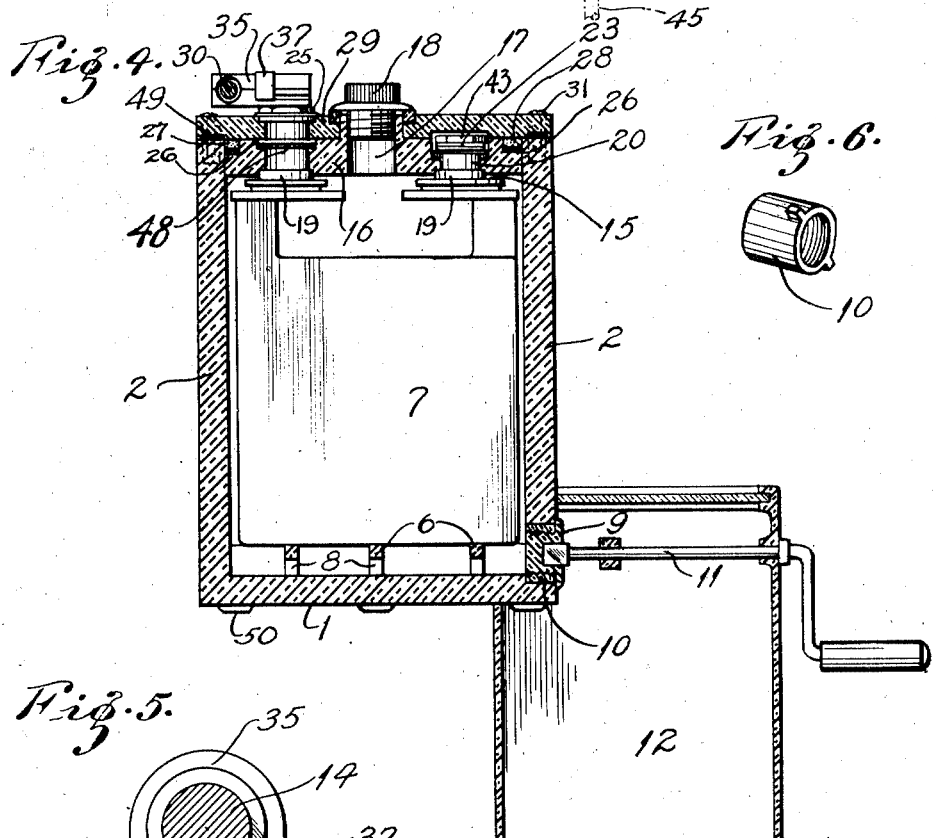
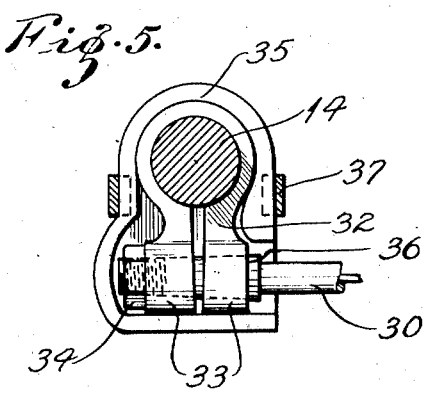
INVENTOR
George W. Hebbeler
By Cornwall, Bedell & James
ATTORNEYS May 14, 1929.  G. W. HEBBELER  1,712,822
BATTERY
Filed Aug. 15, 1925   2 Sheets-Sheet 2
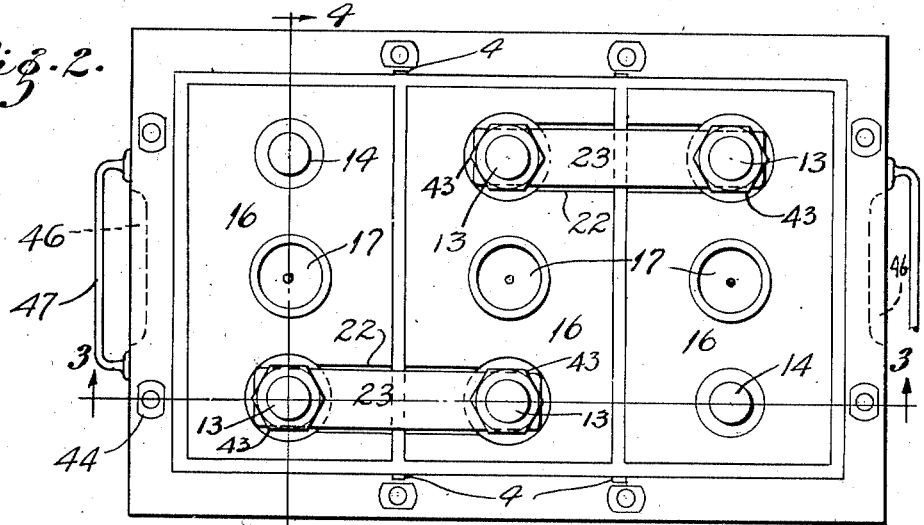
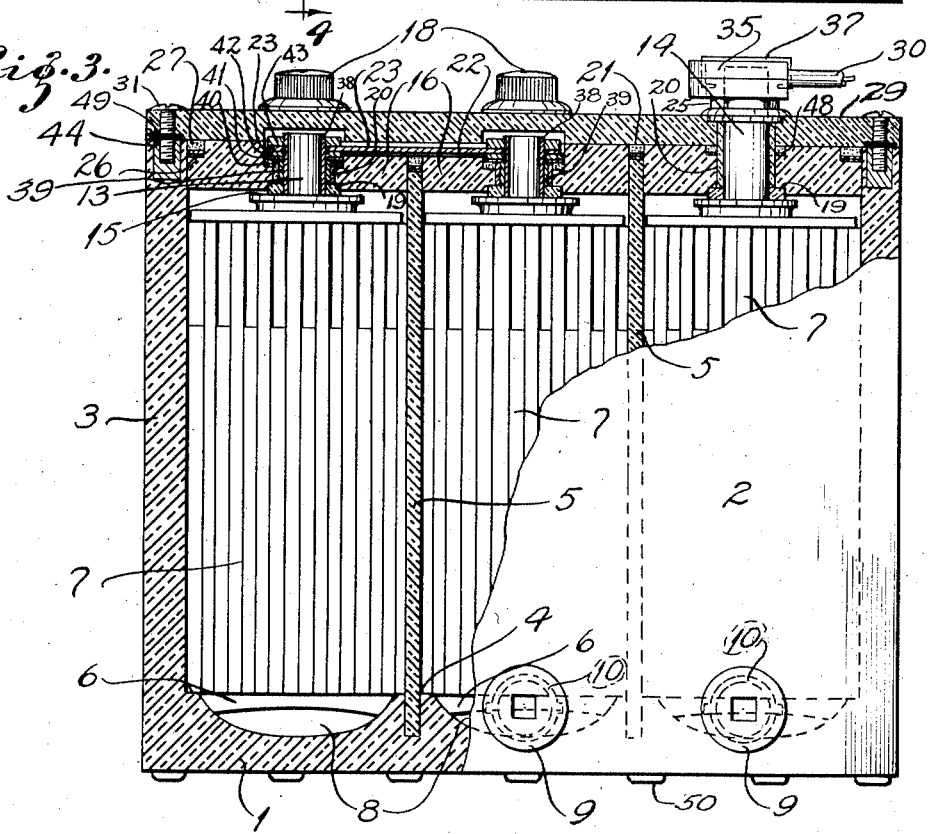
INVENTOR
George W. Hebbeler
By Cornwall, Badell & Janus
ATTORNEYS Patented May 14, 1929.

1,712,822

UNITED STATES PATENT OFFICE.

GEORGE WILLIAM HEBBELER, OF ST. LOUIS, MISSOURI.

BATTERY.

Application filed August 15, 1925. Serial No. 50,448.

My invention relates to batteries, such as are in common use on automobiles and for radio equipment, and consists in a number of detail improvements.

The main object of my invention is to construct a battery which the ordinary owner may disassemble readily in order to inspect, clean, repair, or replace parts which may need attention. I also desire to construct a battery in which the sediment shed by the plates or produced from other sources may be removed from the battery without disassembly thereof.

Another object of my invention is to produce an enclosed battery in which the likelihood of short-circuiting the poles by accidental contact therewith of tools or other conducting articles may be eliminated.

Other objects of my invention are to eliminate the use of separate cell jars; to insure ventilation and cushioning of the bottom of the box irrespective of the support provided therefor; to eliminate all operations of lead-burning in assembling or disassembling the cells of the battery; to facilitate the repeated removal and application of the sealing compound to the battery cells; and to prevent sulphating of the battery terminals and to facilitate the application and removal of the cables to the terminals.

In the accompanying drawings illustrating a selected embodiment of my invention—

Figure 1 is a top view of the complete battery.

Figure 2 is a top view of the battery with the lid removed and is drawn on a larger scale than Figure 1.

Figure 3 is in part a longitudinal vertical section taken substantially on line 3—3 of Figure 2 and in part is a side elevation of the battery.

Figure 4 is a vertical transverse section through the battery taken substantially on line 4—4 of Figure 2 and showing the application to the battery of draining apparatus.

Figure 5 is an enlarged detail of the cable connection and sulphate preventing elements.

Figure 6 is a detail perspective of a bushing referred to below.

The battery case is preferably made of vulcanized rubber with the bottom wall 1, side walls 2 and end walls 3 all formed integrally. Suitable grooves 4 may be provided in the bottom and side walls of the battery for the purpose of receiving solid partitions 5 adapted to divide the case into separate cell containing or forming chambers. If desired, partitions 5 may be formed integrally with the bottom and side walls of the battery instead of being made of separate pieces inserted in grooves 4. I also prefer to provide integral ribs 6 extending transversely of the bottom of each cell chamber and forming an elevated support for the battery plates 7. The lower portion of each of ribs 6 is recessed as indicated at 8 to provide a clear passageway throughout the length of the cell chamber.

At one end of each cell chamber I provide a removable drain plug 9 which may be threaded into or otherwise interengaged with the sides of an opening in the bottom of the cell chamber. I have illustrated a preferred construction in which the side of the opening is formed by a winged bushing 10 of fiber or other material inserted into the walls of the case. The exterior of plug 9 is adapted to engage a tool, such as is indicated at 11 for the purpose of removing the drain plug. I prefer to provide a drainage vessel 12 with one corner cut away as indicated so that it may be fitted tightly against the bottom and side of the battery case and when so fitted will accommodate the tool 11 so that plug 9 may be removed with vessel 12 in the position shown.

The above described drainage arrangement enables anyone to drain the electrolyte from the case without inverting the battery and without any danger of injury to the person or clothing due to contact with the electrolyte. If the top of the vessel be covered with glass, the protection is complete and at the same time the discharge of the electrolyte or other matter may be observed. After the electrolyte has been removed, the cell chamber may be washed out thoroughly by pouring water into the same through the usual opening provided at the top of the cell chamber and by this means any sediment which may have accummulated on the bottom of the chamber may be discharged through the drain opening. Thereupon the plug may be replaced and the electrolyte poured back into the cell chamber without the seal of the chamber ever having been disturbed. The above described construction affords the layman opportunity to service his battery at intervals and avoid the shortening of the life thereof by short-circuiting of the cell plates through the sediment usually deposited by the shedding of material by the plates.

The positive and negative plates 7 in each cell are respectively united at their upper ends in the usual manner and are provided with upstanding posts 13 or 14. The battery terminal posts 14 are smooth throughout most of their length but have a restricted portion threaded for nuts 25 referred to below. Each of the intermediate posts 13 has its vertical face enclosed by a brass bushing 38 threaded near its upper end and jacketed below its thread with a lead sleeve 39. Each of the posts 13 and 14 is provided with a shoulder 15 which carries a washer 19 of rubber or like material. Above washer 19 each post is enclosed by a rubber tube 20.

Each cell chamber is provided with a cover 16 of vulcanized rubber or other insulating material fitting over tubes 20, resting on washer 19 and extending between the walls of the case and the adjacent partition or partitions 5. Each cover is provided with a central opening 17 which may be closed by a plug 18 in the usual manner.

Around the edge of each cover 16 I provide a groove for receiving sealing means for the cell chamber. This groove may be formed by a rabbet, in the edge of the cover, and the adjacent wall of the case or it may be formed by the opposing sides of two adjacent covers and the top edge of a partition 5 as indicated at 21 in Figure 3. In sealing the cell chambers, I preferably place a strip of flexible material 26 in the bottom of the groove and over it place enough viscous sealing material 27 to fill the groove. The flexible strip may be formed of fiber or of lead-covered metal or may be formed of a combination of these materials. The object of this construction is to make it possible for the user to easily remove the sealing material and easily replace it later.

The upper face of each cover is recessed around each post and around each intermediate post 13 suitable sealing material 40 is placed in the bottom of the recess. A fiber washer 41 covers the sealing material and the upper end of rubber tube 20 and a metal washer 42 overlies fiber member 41. Straps 23 connect posts 13, lying in recesses in the covers 16 and overlying washers 42 and are clamped tightly against said washers by nuts 43 screwed onto the threaded end of the brass bushings 38, the remainder of the bushing being protected by its lead jacket 39. These nuts 43, through straps 23, also clamp the covers 16 against the washers 19 on post shoulders 15. Around each terminal post 14 is a seal 48 similar to that provided around covers 16.

By the use of the sealing elements referred to, the interior of each cell is completely closed from the atmosphere except for vent 17. Nevertheless, the ordinary layman can easily remove the nuts 43, the sealing strip carrying therewith material 27, and cover 16, whereupon the plates 7 may then be removed and inspected and repaired and the parts then replaced in the reverse order, again making the cell liquid tight. All of the above operations are performed without any lead-burning or other comparatively difficult operation requiring special equipment and training.

A gasket 49 on the edge of the case acts as a seal and a cushion for a lid 29, preferably of vulcanized rubber, which extends solidly over the case except for spaced openings for the battery positive and negative posts and for openings over the vent 17 leading to each cell chamber. These central openings in lid 29 will receive the cell closing plugs 18. Suitable recesses in the underside of the lid will accommodate the ends of posts 13 and their nuts 43. The lid may be securely fastened to the edges of the case walls by finely threaded machine screws 31 of fiber material, to receive which screws I provide renewable bushings 44 so that breaking of threads will not require a new case or an unsecured lid. Other lid securing means may be provided and I show additional means in nuts 25 which clamp the lid against covers 16, thereby making a firm connection between all parts of the entire battery structure. The lid 29 engages cover 16, either directly or through the sealing elements 26—27, and holds the plates 7 against their supports 6. With the lid in place, the covers 16 of the cell chambers and the cell connecting straps 23 are fully protected against injury by external objects. The case may be recessed as indicated at 46 to provide a finger hold or it may have a handle 47 attached in the usual manner. If desired, both lifting means may be provided.

To facilitate the application and removal of the cable 30 to the terminal posts of the battery, I provide a split clamping ring 32 having ears 33 formed on its ends, the ears being provided with transverse openings aligned with each other and tapered from the outer face of one ear to the outer face of the other ear. The cable terminates in a tapered portion fitting in the tapered opening in ears 33 and having a threaded end adapted to engage a nut 34, whereby the cable may be drawn into secure contact with the ears 33 and the latter may be clamped together to securely engage the terminal post. At 45 in Figure 1 I indicate a lateral extension of cables 30 and obviously the housing may be recessed for such entrance of the cable, if desired.

To prevent sulphating of the connection between the cable and the post, I provide a housing 35 for each of these connections consisting of two sections, an upper section having an imperforate wall and a lower section apertured to fit over the post extension 14. The two sections having meeting recesses 36 fitting around cable 30 and the two sections may be clamped together by a spring clip 37 slidable over one section with its ends extending into a groove in the other section. By filling this housing with grease or other similar material, the entire exposed area of the post and cable may be protected from contact with the air which will eliminate the undesirable sulphating action usually present in batteries of this type.

When lid 29 is in place and housings 35 are applied, i. e., the battery completely installed, there are no projecting metal parts which can be short-circuited accidentally thereby running down the battery or creating a fire hazard or injury to the person by explosion of hydrogen. When the cells are to be opened, a flat wrench is required for nuts 43 and the same cannot be turned so as to engage two posts of opposite polarity.

The bottom of the case is provided with supporting buttons 50 of rubber or other suitable material to space the bottom 1 from the shelf or strap on which it is carried. These buttons constitute means for cushioning and ventilating the bottom which is always desirable and especially so if the case exterior be formed of wood or other material subject to decay or to damage from electrolyte which otherwise might be held in contact with the case.

Obviously, many details of my invention may be modified without departing from the spirit thereof as expressed in the appended claims.

I claim:

1. In a battery, a group of lead plates having an upstanding lead post, a sleeve of harder metal surrounding the upper end of said post and threaded exteriorly, a lead jacket about the lower portion of said sleeve forming a shoulder thereon, a lead strap fitting over said sleeve and resting on said shoulder for connecting said post to a similar post of another cell, and a nut of harder metal than said post threaded on said sleeve for clamping said strap against said shoulder.

2. In a battery, a case, cell chambers, plates therein, individual covers for said chambers, posts on said plates with upwardly facing shoulders, removable straps connecting said posts and extending over said covers and engaging the latter to hold them against the shoulders on the posts and a lid resting on the upper edges of said case and extending over said straps and provided with openings for the terminal poles of the battery.

3. In a battery, a case having side walls and partitions forming cell chambers, plates in said chambers, covers for said chambers extending between but unsecured to said walls and partitions, shouldered posts on said plates extending through said covers and provided with threaded upper ends, removable straps connecting said posts, nuts screwed on the threaded portions of said posts and clamping said covers against the shoulders on said posts, and a lid extending over said covers and secured to the edges of said case and positively holding said covers, posts and plates in position.

In testimony whereof I hereunto affix my signature this 10th day of August, 1925.

GEORGE WILLIAM HEBBELER.